Jan. 8, 1924.
H. KLONICK
NONSKID CHAIN
Filed Oct. 4, 1922
1,480,269
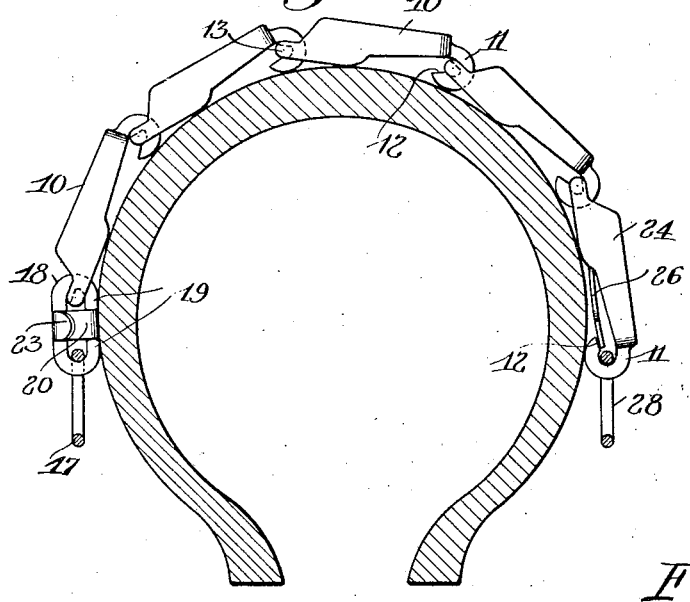
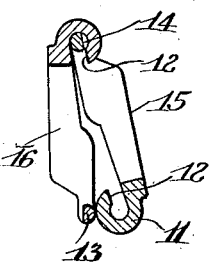
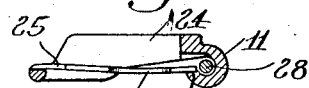
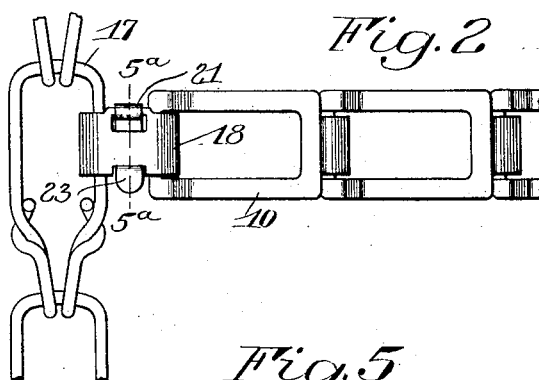
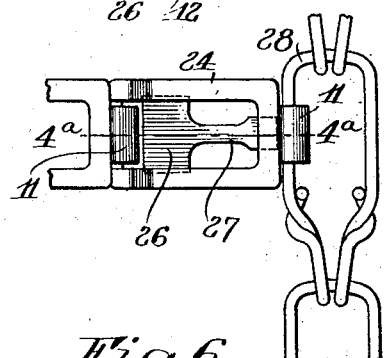
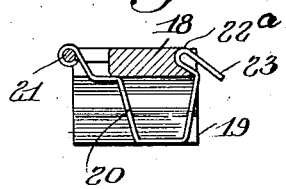
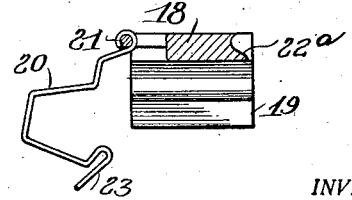
INVENTOR
Harry Klonick
BY
his ATTORNEY Patented Jan. 8, 1924.

1,480,269

UNITED STATES PATENT OFFICE.

HARRY KLONICK, OF ROCHESTER, NEW YORK.

NONSKID CHAIN.

Application filed October 4, 1922. Serial No. 592,432.

*To all whom it may concern:*

Be it known that I, HARRY KLONICK, of Rochester, in the county of Monroe and State of New York, have invented certain new and useful Improvements in Nonskid Chains; and I do hereby declare the following to be a full, clear, and exact description of the same, reference being had to the accompanying drawings, forming a part of this specification, and to the reference numerals marked thereon.

This invention relates to non-skid chains for vehicle wheels and more particularly to the variety having cross chains extending at intervals transversely of the tread of the wheel or tire and composed of links detachably connected for convenience in making repairs. The chief object of the invention is to provide a practical and economical chain of this character comprising cross chains having effective and substantial traction and wear resisting portions affording durability in use and composed of links capable of being conveniently detached by hand without the use of tools for making replacements but so constructed as to prevent inadvertent detachment in use or in any folded position in which they may be placed when not in use. To these and other ends the invention consists in certain improvements and combinations of parts all as will hereinafter be more fully described, the novel features being pointed out in the claims at the end of the specification.

In the drawings:

Figure 1 is a transverse sectional view through the tire of a wheel having a chain embodying the present invention applied thereto;

Figure 2 is a plan view of a portion of the chain as appearing when disposed in a plane;

Figure 3 is a longitudinal sectional view through a pair of adjacent links arranged in position for detachment from each other;

Figure 4 is a sectional view on the line 4ª—4ª of Figure 2 showing the construction of a terminal link;

Figures 5 and 6 are similar views on the line 5ª—5ª of Figure 2 showing the construction of another terminal link with the parts thereof in different positions.

Similar reference numerals throughout the several views indicate the same parts.

The invention is embodied in the present instance in a chain more particularly adapted for use on the tire of an automobile or other vehicle wheel and comprising a pair of side elements arranged to extend substantially circumferentially of the tire on opposite sides thereof and connected at intervals by means of cross chains extending transversely over the tread for gripping the ground. The side elements are preferably chains of any suitable variety such as shown provided with loops or other means for the convenient attachment of the ends of the cross chains.

The cross chains preferably comprise a plurality of links 10 having the substantially rectangular frame shape shown with relatively high sides insuring effective gripping action with the ground and affording ample wearing material. The link is provided at one end with a downwardly turned hook 11 for connecting the same with an adjacent link, the hook being depressed or disposed as shown well below the plane of wear in use, so that it is well protected against being worn away and weakened in use. The hook has an end 12 formed with a flattened face disposed toward the lower side of the link in spaced relation therewith for a purpose which will appear more fully hereafter.

The opposite end of the link is formed with a hook receiving bar 13 which is also depressed or disposed well below the wearing surface of the link so as to be protected in use. This bar has a generally circular cross section slightly smaller in diameter than the opening inside the hook 11 and is flattened on its upper side as at 14 to pass the end 12 of the hook as shown in Figure 3 when adjacent links 15 and 16 are swung about the connecting hook and bar as a pivot and disposed as shown with their lower sides together or in substantially back to back relation. It is to be noted however that each hook projects sufficiently downwardly below the under side of the link to prevent the movement of a link with which it is connected to the detachable position shown in Figure 3. In other words a pair of the links can only be disposed in the position for detachment shown when the link 16 is an end link of the chain. This construction therefore prevents inadvertent detachment of any of the links either when in use or in any folded or other position in which they may be disposed when not in use but the links may nevertheless be quickly and conveniently detached from each other successively or progressively beginning at an end of the cross chain as provided for by the construction described below. The links thus have a relatively raised body portion providing a substantial supply of wearing material, with efficient connecting means relatively depressed to protect the same against wear and which cannot be accidentally disconnected, but may nevertheless be quickly detached without tools when so desired. If preferable of course an enlarged or heavier link may be employed over the center of tread of the wheel, instead of employing links of uniform size as shown in the present instance.

The side elements are shown in the present instance as chains of a variety commonly employed for such purposes having wire links 17 in the form of loops affording convenient means for the attachment of the ends of the cross chains. A detachable connection is employed between the side chain and one end of the cross chain so that the links of the latter may be progressively detached as described above and if desired in fact both ends of the cross chain may be detachably connected with the adjacent side chains.

While such detachable connection between the side and cross chains may have various forms, there is shown in the present instance a form of link connection which has been found practical and efficient comprising a strip or band formed into a loop 18 as shown, the ends 19 of which are arranged in spaced relation to afford an opening for engaging one end of the loop with the bar 13 of the end link of the cross chain and the other with one of the loops 17 of the adjacent side chain. Link 18 is detachably locked in such engaged relation by means of a resilient clip 20 pivotally supported as at 21 on the side of loop 18 opposite its opening and having an end portion 22 adapted to be detachably sprung over a shoulder 22ª on the opposite edge of the same side of the link. The clip as shown crosses the loop of the link at its center and also has a portion which enters and effectively closes the opening in the side of the link. By means of a finger piece 23 at the end of the clip the latter may be readily disengaged from shoulder 22ª and swung on its pivot to the open position shown in Figure 6 to permit detachment of link 18 from the cross chain or side chain or both if desired, but when the clip is returned to the position shown in Figure 5 the link is effectively locked in connecting engagement with the cross and side chains so that they cannot be accidentally disconnected.

The opposite end of the cross chain is preferably provided also with means for detachment from the corresponding side chain comprising a link 24 similar in construction to the cross chain links 10, except that the opposite inner surfaces of portions of the side walls of the link are slotted as at 25 to receive a resilient keeper plate 26 which is slid into the slot of the link and located as shown in Figure 4. Plate 26 is preferably reduced in width adjacent one end as shown at 27 so that it may be easily flexed at this portion by hand and this end of the link rests against the end 12 of the hook 11 of the link so that when the hook is engaged with a loop 28 of the side chain as shown it cannot be accidentally detached but can only be disconnected by springing the keeper plate 26.

As indicated in the above description of the construction any one of the cross chains may be disconnected as a whole without the use of tools by detaching links 18 and 24, and the links of the cross chain may also be quickly and easily separated from one another by hand without tools, after link 18 has been detached, by folding the adjacent end link of the cross chain to the position occupied by link 16 in Figure 3. The next link may be then similarly disconnected and so on to reach and replace any link which may have become worn or broken. As indicated in the drawings, the construction provides a highly substantial and durable chain insuring effective traction and capable of being manufactured at a comparatively low cost. The principal feature of economy however resides of course in the fact that the cross chains which receive the wear may have the links thereof replaced from time to time through the detachable feature described. The operation of detaching and replacing the parts may be quickly and conveniently accomplished in the manner described by hand and without the use of tools.

I claim as my invention:

1. In a non-skid chain, a cross chain comprising a plurality of links having raised wear resisting body portions and depressed means for detachably connecting the links together adapted and arranged to prevent detachment of said links except by the detachment thereof successively beginning with a terminal one of said links.

2. In a non-skid chain, a pair of side chains and cross chains connecting the same having a plurality of links each comprising a raised wear resisting body portion and depressed means for detachably connecting the same with adjacent links adapted and arranged to prevent the detachment of adjacent links except by the detachment of said links successively beginning with a terminal one thereof.

3. In a non-skid chain, a cross chain comprising a plurality of links detachably connected together by means brought to detachable position by swinging end links successively in order about said connecting means as a pivot to bring the under side of an end link against the under side of the adjacent link, said connecting means being adapted for obstructing the movement of any link other than an end link to said detachable position.

4. In a non-skid chain, a cross chain comprising a plurality of links each having a central wear resisting portion, a hook adjacent one end and a hook receiving member adjacent the other end, said hook and member being adapted and arranged for connection and detachment exclusively when the under sides of adjacent links are brought together by swinging said links about said hook and member as a pivot, said hooks serving also to obstruct the movement of any link other than an end link to said position for detachment.

5. In a non-skid chain, a pair of side elements and a cross chain therebetween having a plurality of links each comprising a raised wear resisting body portion and depressed means for detachably connecting the same with adjacent links adapted to be detached progressively from an end of said cross chain, and a detachable connection between said cross chain end and the adjacent side element.

6. In a non-skid chain, a cross chain comprising a plurality of links of substantially rectangular shape with relatively high sides forming wear resisting portions, each of said links having a hook at one end for connection with an adjacent link and a hook receiving bar at the other end having a flattened side adapted for detachment from the hook of an adjacent link with the links in substantially back to back relation, said hook being adapted in engagement with an adjacent link to obstruct movement of the latter to said position for detachment.

7. In a non-skid chain, a pair of side chains, cross chains therebetween having a plurality of links of substantially rectangular shape with relatively high sides forming wear resisting portions, each of said links having a hook at one end and a hook receiving bar at the other having a flattened side adapted for detachment from the hook of an adjacent link with the links in substantially back to back relation, said hook being adapted in engagement with an adjacent link to obstruct movement of the latter to said position for detachment, and a member detachably connecting an end of said cross chain to the adjacent side chain.

8. In a non-skid chain, a cross chain link of substantially rectangular shape having relatively high sides forming wear resisting portions, a downwardly turned hook at the lower side of an end of said link, and a hook receiving bar at the lower side of the other end of said link having a flattened side adapted to detachably pass the end of a hook of an adjacent link with the links swung to bring their lower sides substantially together, said hook being extended downwardly to a position adapted in engagement with an adjacent link to obstruct movement of the latter to said detaching position.

9. In a non-skid chain, a pair of side chains, a cross chain therebetween having a plurality of links each comprising a raised wear resisting body portion and depressed means for detachably connecting the same with adjacent links adapted to be detached progressively from an end of said cross chain, one of said links at one end of the latter having resilient means detachably securing the cross chain to the adjacent side chain, and a detachable member connecting the other end of said cross chain to the other side chain.

HARRY KLONICK.